(12) United States Patent
Lemon et al.

(10) Patent No.: US 9,168,844 B2
(45) Date of Patent: Oct. 27, 2015

(54) METHODS AND SYSTEMS FOR DIAGNOSING PERFORMANCE OF ACTIVE COOLING SYSTEM IN AN ELECTRIC VEHICLE

(75) Inventors: Brian P. Lemon, Plymouth, MI (US); Scott M. Skelton, Belleville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 413 days.

(21) Appl. No.: 13/561,683

(22) Filed: Jul. 30, 2012

(65) Prior Publication Data

US 2014/0027087 A1  Jan. 30, 2014

(51) Int. Cl.
  *H01M 10/50* (2006.01)
  *B60L 11/18* (2006.01)
  (Continued)

(52) U.S. Cl.
  CPC ............. *B60L 11/1875* (2013.01); *B60L 1/003* (2013.01); *B60L 1/02* (2013.01); *B60L 11/1874* (2013.01); *H01M 10/613* (2015.04); *H01M 10/625* (2015.04); *H01M 10/651* (2015.04); *H01M 10/6569* (2015.04); *B60L 2240/34* (2013.01); *B60L 2240/36* (2013.01); *B60L 2240/421* (2013.01); *B60L 2240/545* (2013.01); *B60L 2240/662* (2013.01); *Y02T 10/642* (2013.01); *Y02T 10/705* (2013.01); *Y02T 10/7005* (2013.01); *Y02T 10/7291* (2013.01); *Y02T 90/16* (2013.01)

(58) Field of Classification Search
  CPC ....................................................... H01M 10/50
  USPC .......................................................... 429/62
  See application file for complete search history.

(56) References Cited

U.S. PATENT DOCUMENTS

| | | | |
|---|---|---|---|
| 6,377,880 B1 * | 4/2002 | Kato et al. | 701/32.9 |
| 2011/0213780 A1 * | 9/2011 | Suganuma et al. | 707/740 |
| 2012/0082871 A1 | 4/2012 | Simonini et al. | |

FOREIGN PATENT DOCUMENTS

| | | |
|---|---|---|
| CN | 101633306 A | 1/2010 |
| CN | 101837727 A | 9/2010 |
| CN | 102175461 A | 9/2011 |
| CN | 102237538 A | 11/2011 |

(Continued)

OTHER PUBLICATIONS

State Intellectual Property Office of the People's Republic of China, Office Action for Chinese Patent Application No. 201310324000.2 mailed Jun. 24, 2015.

*Primary Examiner* — Kenneth Douyette
*Assistant Examiner* — James Lee
(74) *Attorney, Agent, or Firm* — Ingrassia Fisher & Lorenz, P.C.

(57) ABSTRACT

Methods and electric vehicle diagnostic systems are provided for diagnosing performance of an active cooling system for cooling a rechargeable energy storage system (RESS) with a coolant. In one embodiment, a method includes determining, via a controller, whether the coolant temperature ($T_C$) is less than the ambient temperature plus a first calibrated value ($T_A+V_1$). The method also includes determining, via a controller, whether the coolant temperature ($T_C$) is less than the RESS temperature plus a second calibrated value ($T_R+V_2$). When the coolant temperature is less than the ambient temperature plus the first calibrated value and less than the RESS temperature plus the second calibrated value, the method provides for recording a diagnostic pass.

18 Claims, 3 Drawing Sheets

(51) Int. Cl.
*B60L 1/00* (2006.01)
*B60L 1/02* (2006.01)
*H01M 10/625* (2014.01)
*H01M 10/6569* (2014.01)
*H01M 10/651* (2014.01)
*H01M 10/613* (2014.01)

(56) References Cited

FOREIGN PATENT DOCUMENTS

CN 102442219 A 5/2012
WO 2011121717 A1 10/2011

* cited by examiner

METHODS AND SYSTEMS FOR DIAGNOSING PERFORMANCE OF ACTIVE COOLING SYSTEM IN AN ELECTRIC VEHICLE

TECHNICAL FIELD

The technical field generally relates to active cooling systems for cooling rechargeable energy storage systems (RESS) in electric vehicles, and more particularly relates diagnostic systems and methods for diagnosing the performance of active cooling systems for cooling RESS.

BACKGROUND

Electric vehicles are rapidly gaining popularity in today's automotive marketplace. Electric vehicles offer several desirable features, such as eliminating emissions and usage of petroleum-based fuels at the consumer level, and potentially lower operating costs. A key component of electric vehicles is the rechargeable energy storage system (RESS), which is typically a battery pack and can represent a substantial proportion of the vehicle's cost. Battery packs in electric vehicles typically consist of numerous interconnected cells, operating at a relatively high voltage, and delivering power on demand. Maximizing battery pack life is a key consideration in the design and operation of electric vehicles.

In order to maximize battery pack life, the temperature in the battery pack must be controlled so that it does not exceed a certain level. Control systems in existing electric vehicles typically prescribe a maximum allowable temperature in the battery pack, and use an onboard thermal management system to prevent battery pack temperature from rising above the prescribed limit. Additionally, the thermal management system may utilize an intrusive diagnostic operation that consumes a large amount of energy and resources to monitor the performance of the thermal management system.

There is an opportunity to employ a non-intrusive active cooling system diagnostic methodology which provides timely analysis by the intrusive diagnostic operation when necessary, but which reduces the diagnostic energy need during typical operation. Such a method could yield cost savings for electric vehicles through the reduction of energy use by the diagnostic mechanisms, and increase customer satisfaction through improved vehicle driving range.

Accordingly, it is desirable to provide electric vehicles with improved methods and systems for diagnosing RESS active cooling systems. In addition, it is desirable to provide non-intrusive methods and systems for diagnosing RESS active cooling systems which use reduced amounts of energy while providing proper diagnostic oversight. Furthermore, other desirable features and characteristics will become apparent from the subsequent detailed description and the appended claims, taken in conjunction with the accompanying drawings and the foregoing technical field and background.

SUMMARY

An electric vehicle includes a rechargeable energy storage system (RESS) configured to power propulsion of the vehicle. The electric vehicle is further provided with an active cooling system for cooling the RESS. The active cooling system includes a coolant loop for directing a coolant through the RESS and a refrigerant loop configured to selectively cool the coolant. A diagnostic system is provided for diagnosing performance of the active cooling system. The diagnostic system includes a first temperature sensor configured to monitor ambient temperature, a second temperature sensor configured to monitor the RESS temperature, and a third temperature sensor configured to monitor the coolant temperature. Further, the diagnostic system includes a controller configured to compare the coolant temperature with the ambient temperature and the RESS temperature to determine whether the active cooling system is performing properly.

A method is provided for diagnosing performance of an active cooling system for cooling a rechargeable energy storage system (RESS) with a coolant in an electric vehicle. The method includes determining, via a controller, whether the coolant temperature ($T_C$) is less than the ambient temperature plus a first calibrated value ($T_A+V_1$). The method also includes determining, via a controller, whether the coolant temperature ($T_C$) is less than the RESS temperature plus a second calibrated value ($T_R+V_2$). When the coolant temperature is less than the ambient temperature plus the first calibrated value and less than the RESS temperature plus the second calibrated value, the method provides for recording a diagnostic pass.

DESCRIPTION OF THE DRAWINGS

The embodiments will hereinafter be described in conjunction with the following drawing figures, wherein like numerals denote like elements, and wherein.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Figure 1:
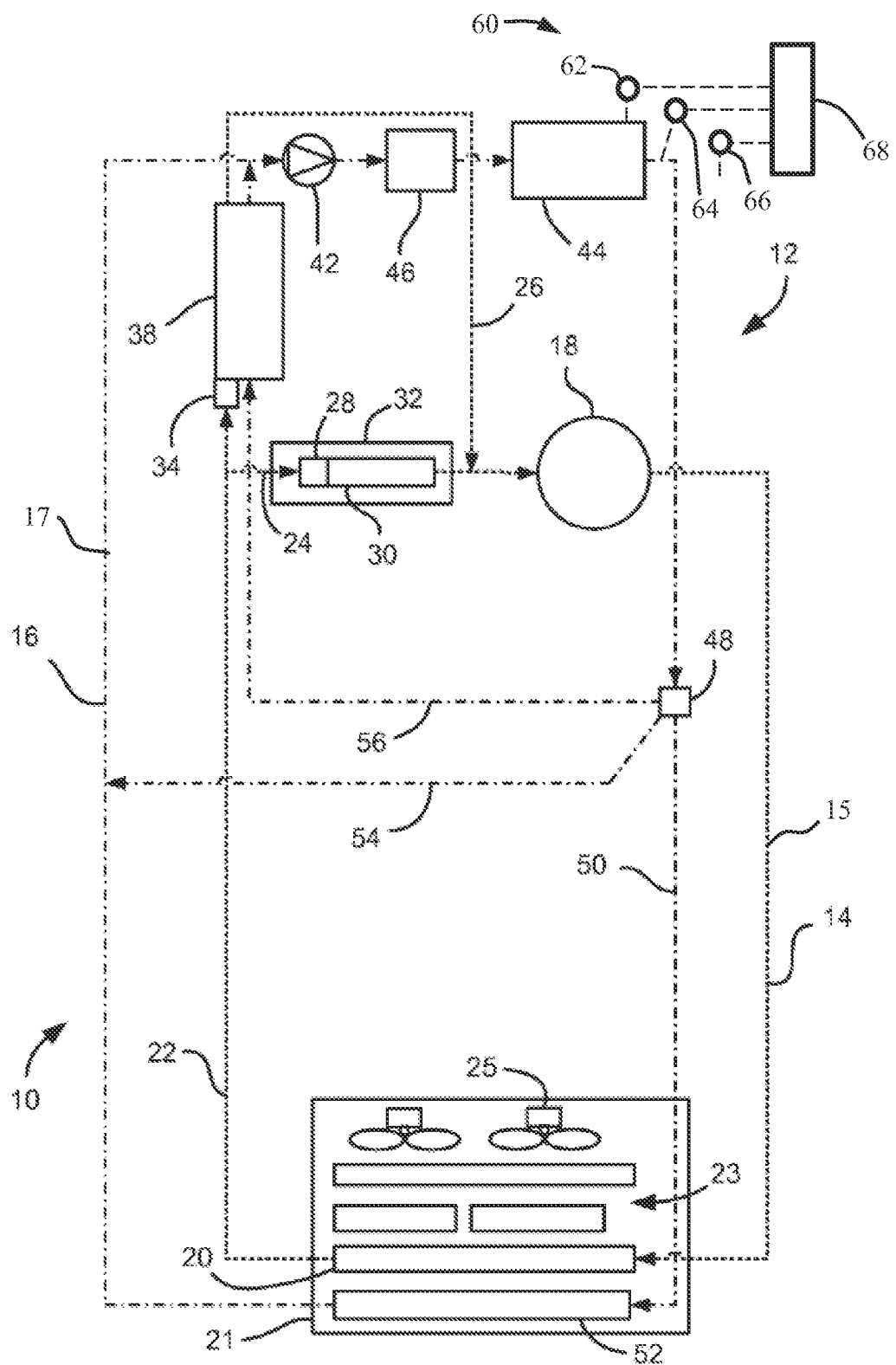
FIG. 1 is a schematic view of a RESS active cooling system; a portion of a heating, ventilation, and air conditioning (HVAC) system; and a diagnostic system for diagnosing performance of the RESS active cooling system for a battery electric vehicle in accordance with an embodiment.

Referring to FIG. 1, a vehicle, indicated generally at 10, is shown. This vehicle 10 may be, for example, a battery electric vehicle (BEV). The vehicle 10 includes a rechargeable energy storage system (RESS) active cooling system 12 that includes a refrigerant loop 14, through which a refrigerant 15 flows, and a coolant loop 16, through which a coolant liquid 17 flows.

The refrigerant loop 14 includes a refrigerant compressor 18 and a condenser 20, which may be part of a condenser, radiator, fan module (CRFM) 21. The CRFM 21 may include other heat exchangers 23 and fans 25 used to cool fluids from other vehicle systems. The refrigerant compressor 18 may be electrically driven, with an ability to adjust the speed of the compressor during operation.

The condenser 20 directs refrigerant 15 into a refrigerant line 22 that splits into a HVAC leg 24 and a chiller leg 26 of the refrigerant loop 14. The HVAC leg 24 directs the refrigerant through an expansion device 28 and into an evaporator 30, which is located in a HVAC module 32. Refrigerant 15 exiting the evaporator may be directed back to the refrigerant compressor 18.

The chiller leg 26 directs the refrigerant through an expansion device 34 and then through a chiller (refrigerant-to-coolant heat exchanger) 38. Refrigerant 15 exiting the chiller 38 is directed back to the refrigerant compressor 18.

Figure 2:
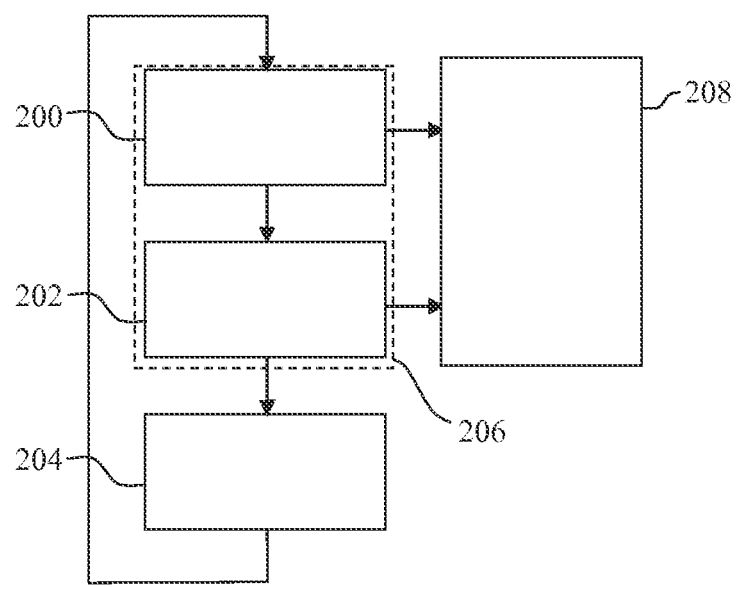
FIG. 2 is a flow chart illustrating a method for diagnosing performance of a RESS cooling system in accordance with an embodiment.

The chiller 38 is also in fluid communication with the coolant loop 16. The dashed lines in FIG. 2 represent lines through which refrigerant 15 flows while the dash-dot lines represent lines through which the coolant liquid 17 flows. The coolant liquid 17 may be a conventional liquid mixture such as an ethylene glycol and water mix, or may be some other type of liquid with suitable heat transfer characteristics.

The coolant loop 16 includes a coolant pump 42 that pumps the coolant liquid 17 through the loop and is controllable to vary the flow rate of the coolant liquid 17 flowing through the coolant loop 16. The coolant loop 16 also includes a rechargeable energy storage system (RESS), such as a battery pack, 44 and an electric coolant heater 46. The coolant liquid 17 flowing through the RESS 44 is used to cool or warm the RESS as needed. The electric coolant heater 46 can be activated to heat the coolant liquid 17 flowing through it in order to provide warming to the RESS 44.

A coolant routing valve 48 is located in the coolant loop 16 and can be selectively actuated to direct the coolant liquid 17 through three different branches of the coolant loop 16. A first branch 50 includes a RESS radiator 52, which is positioned to have air flowing through it. The RESS radiator 52 may be part of the CRFM 21. A second branch 54 forms a coolant bypass line where the coolant liquid 17 does not flow through the RESS radiator 52 or the chiller 38. A third branch 56 directs the coolant liquid 17 through the chiller 38. All three branches join together to direct the coolant liquid 17 back through the RESS 44.

As shown in FIG. 1, the vehicle 10 further includes a diagnostic system 60 for diagnosing the performance of the RESS active cooling system 12. The diagnostic system 60 includes a temperature sensor 62, or a plurality of temperature sensors 62, for monitoring the temperature of the RESS or battery pack 44. Further, the diagnostic system 60 includes a temperature sensor 64, or a plurality of temperature sensors 64, for monitoring the temperature of the coolant liquid 17. While the temperature sensor 64 is shown connecting to the coolant loop 16 immediately downstream of the RESS 44, the temperature sensor 64 could be positioned at other desired locations along the flow path of the coolant liquid 17. As shown, the diagnostic system 60 includes an ambient temperature sensor 66, or a plurality of temperature sensors 66, for monitoring ambient temperature. While illustrated as an independent sensor in FIG. 1, it is contemplated that the ambient temperature sensor 66 be utilized elsewhere in the vehicle 10 and provided for use to the diagnostic system 60. The diagnostic system 60 is further provided with a controller 68 (preferably comprising a processor) that is in electronic communication with temperature sensors 62, 64 and 66. As a result, the controller 68 may perform the RESS active cooling system diagnostic functions as described below.

Referring now to FIG. 2, a method for diagnosing performance of the RESS active cooling system 12 is illustrated for conditions when the vehicle is powered on or powered off. The method begins at step 200 by determining whether the coolant temperature ($T_C$) is less than the ambient temperature plus a first calibrated value ($T_A+V_1$). During this step, the controller 68 provides the first calibrated value. The first calibrated value may be predetermined or calculated based on operating conditions, such as whether the active cooling system is currently operating or how recently the active cooling system was operating. Further, the controller 68 obtains the coolant temperature and the ambient temperature from the respective temperature sensors, and determines whether ($T_C$)<($T_A+V_1$).

If the coolant temperature is less than the ambient temperature plus the first calibrated value, then at step 202 it is determined whether the coolant temperature ($T_C$) is less than the RESS temperature plus a second calibrated value ($T_R+V_2$). During this step, the controller 68 provides the second calibrated value which may be predetermined or calculated based on operation conditions. The second calibrated value may be predetermined or calculated based on operating conditions, such as whether the active cooling system is currently operating or how recently the active cooling system was operating. The second calibrated value may be identical to the first calibrated value. The controller 68 obtains the RESS temperature from the respective temperature sensor, and determines whether ($T_C$)<($T_R+V_2$).

If the coolant temperature is less than the RESS temperature plus the second calibrated value, then at step 204, the diagnosis sequence is completed and a diagnostic pass is recorded. As shown in FIG. 2, the method provides for repeating the diagnosis sequence. In an embodiment, the diagnosis sequence is repeated frequently, though not continuously, in order to provide appropriate diagnostics while reducing the use of energy. For example, the controller may be programmed to run the diagnostic sequence every 30 seconds, every minute, every 5 minutes, etc.

It is noted that steps 200 and 202 are collectively identified by a dash-outlined box indicated as step 206. Step 206 can be considered to include the process of determining whether a relative coolant temperature ($\Delta T$) is less than a calibrated delta value. It is noted that all calibrated values herein may be positive, negative or zero. When the relative coolant temperature is less than a calibrated delta value, a diagnostic pass is recorded at step 204. The relative coolant temperature ($\Delta T$) may be calculated by comparing the coolant temperature with either the ambient temperature, the RESS temperature, or both the ambient and RESS temperatures. For example, step 206 may include calculating the relative coolant temperature by subtracting the ambient temperature plus a calibrated value from the coolant temperature ($\Delta T$)=($T_C-(T_A+V)$). On the other hand, step 206 may include calculating the relative coolant temperature by subtracting the RESS temperature plus a calibrated value from the coolant temperature ($\Delta T$)= ($T_C-(T_R+V)$). Alternatively, the method may calculate two relative coolant temperatures by subtracting the ambient temperature plus a first calibrated value from the coolant temperature ($\Delta T_1$)=($T_C-(T_A+V_1)$) and by subtracting the RESS temperature plus a second calibrated value from the coolant temperature ($\Delta T_2$)=($T_C-(T_R+V_2)$).

At step 208, if the coolant temperature is determined to be not less than (equal to or greater than) the ambient temperature plus the first calibrated value at step 200, if the coolant temperature is determined to be not less than (equal to or greater than) the RESS temperature plus the second calibrated value at step 202, or if the relative coolant temperature is determined to be not less than (equal to or greater than) 0 at step 206, then the controller 68 indicates that an intrusive diagnostic operation is necessary. If the vehicle is not running, then the controller indicates that an intrusive diagnostic operation is required immediately. If the vehicle is running, then the controller 68 indicates that an intrusive diagnostic operation is necessary when the vehicle is powered off. Further, if the vehicle is running, the controller 68 can record indications that a diagnostic operation is necessary, and can restart the diagnosis method at step 200. As a result multiple diagnostic operation indications may be recorded and facilitate later diagnosis. On the other hand, the controller 68 can stop the diagnosis method upon indicating a diagnostic operation in order to conserve energy.

Figure 3:
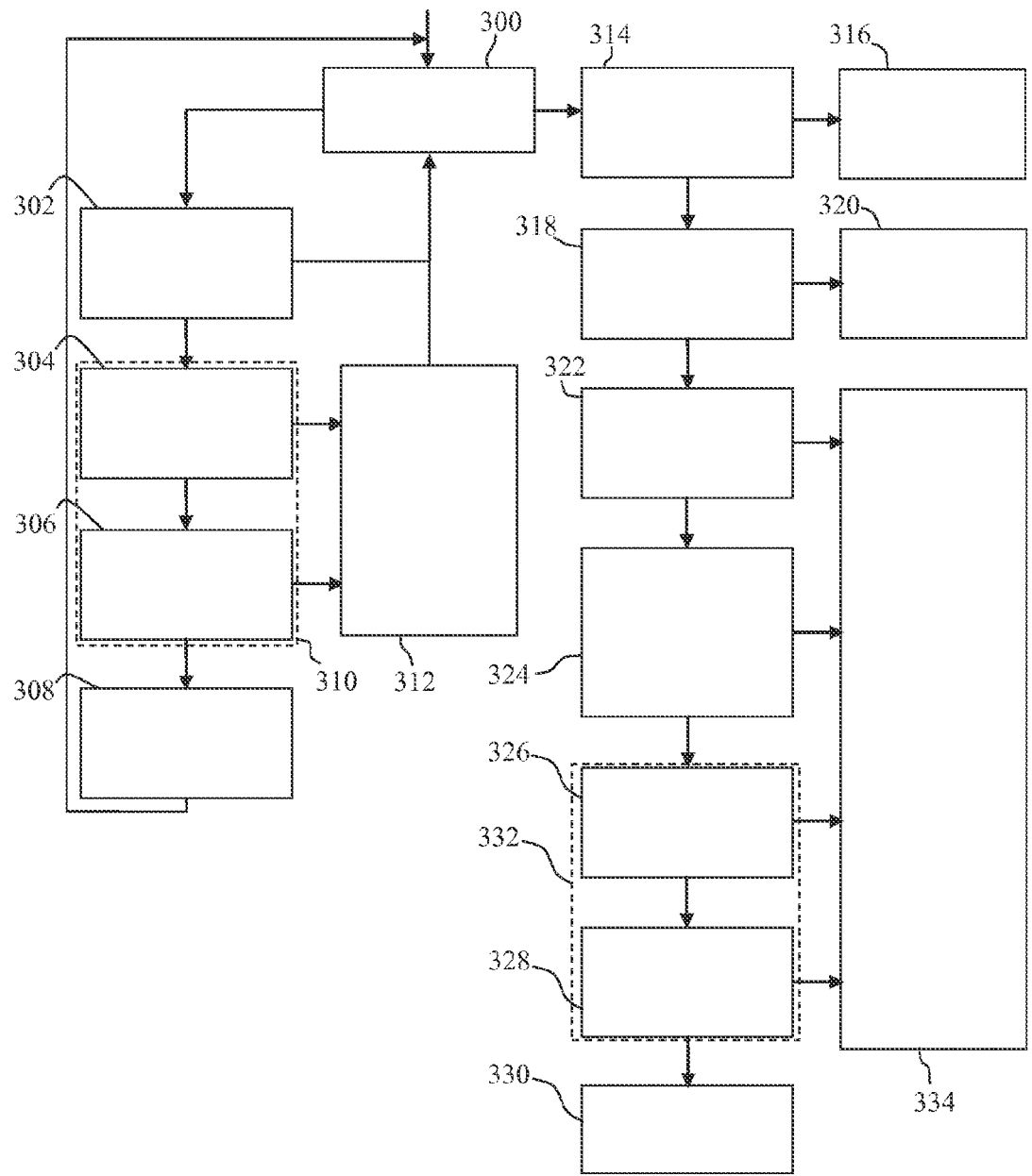
FIG. 3 is a flow chart illustrating a method for diagnosing performance of a RESS cooling system in accordance with an embodiment.

Referring now to FIG. 3, a method for diagnosing performance of the RESS active cooling system 12 begins at step 300 by determining whether the vehicle is running, i.e., powered on. If the vehicle is powered on, then it is determined if the active cooling system is operating at step 302. If the vehicle is powered on and the active cooling system is operating, then the method continues with the steps of the method in FIG. 2. Specifically, at step 304 it is determined whether the coolant temperature ($T_C$) is less than the ambient temperature plus a first calibrated value ($T_A+V_1$). If the coolant temperature is less than the ambient temperature plus the first calibrated value, then at step 306 it is determined whether the coolant temperature ($T_C$) is less than the RESS temperature plus a second calibrated value ($T_R+V_2$). If the coolant temperature is less than the RESS temperature plus the second calibrated value, then at step 308, the diagnosis sequence is completed and a diagnostic pass is recorded. The method provides for repeating the diagnosis sequence thereafter.

In FIG. 3, the determining actions of steps 304 and 306 are collectively identified by a dash-outlined box indicated as step 310. Step 310 can be considered to include the process of determining whether a relative coolant temperature ($\Delta T$) is less than a calibrated delta value. When the relative coolant temperature is less than a calibrated delta value, a diagnostic pass is recorded at step 308. The relative coolant temperature ($\Delta T$) may be calculated by comparing the coolant temperature with either the ambient temperature, the RESS temperature, or both the ambient and RESS temperatures. For example, step 310 may include calculating the relative coolant temperature by subtracting the ambient temperature plus a calibrated value from the coolant temperature ($\Delta T$)=($T_C-(T_A+V)$). On the other hand, step 310 may include calculating the relative coolant temperature by subtracting the RESS temperature plus a calibrated value from the coolant temperature ($\Delta T$)=($T_C-(T_R+V)$). Alternatively, the method may calculate two relative coolant temperatures by subtracting the ambient temperature plus a first calibrated value from the coolant temperature ($\Delta T_1$)=($T_C-(T_A+V_1)$) and by subtracting the RESS temperature plus a second calibrated value from the coolant temperature ($\Delta T_2$)=($T_C-(T_R+V_2)$).

At step 312, if the coolant temperature is determined to be not less than (equal to or greater than) the ambient temperature plus the first calibrated value at step 304, if the coolant temperature is determined to be not less than (equal to or greater than) the RESS temperature plus the second calibrated value at step 306, or if the relative coolant temperature is determined to be not less than (equal to or greater than) 0 at step 310, then the controller 68 indicates that an intrusive diagnostic operation is necessary when the vehicle is powered off. The controller 68 can record indications that an intrusive diagnostic operation is necessary, and can restart the diagnosis method at step 300. As a result, multiple diagnostic operation indications may be recorded and facilitate later diagnosis. On the other hand, the controller 68 can stop the diagnosis method upon indicating a diagnostic operation in order to conserve energy.

If at step 300, it is determined that the vehicle is powered off, then step 314 determines if the vehicle is currently using the active cooling system in the powered off mode. If yes, then the intrusive diagnostic is required at step 316. If the active cooling system is not operating in the powered off mode, then step 318 determines if the active cooling system was operated during the previous drive (i.e., during the previous period when the vehicle was powered on). If the active cooling system was not operated during the previous drive, then the controller indicates that no further diagnosis is necessary at step 320. If the active cooling system was operated during the previous drive, then step 322 determines whether an intrusive diagnostic was indicated, such as at previous step 312. If an intrusive diagnostic was not indicated, then step 324 determines whether the active cooling system was operating less than a calibrated time prior to the vehicle being powered off. The calibrated time may be programmed or calculated by the controller 68.

If the active cooling system was operated less than the calibrated time prior to the vehicle being powered off, then at step 326 it is determined whether the coolant temperature ($T_C$) is less than the ambient temperature plus a first calibrated value ($T_A+V_1$). The controller may calculate the first calibrated value based on the period of time since the active cooling system was operated. If the coolant temperature is less than the ambient temperature plus the first calibrated value, then at step 328 it is determined whether the coolant temperature ($T_C$) is less than the RESS temperature plus a second calibrated value ($T_R+V_2$). The controller may calculate the second calibrated value based on the period of time since the active cooling system was used. If the coolant temperature is less than the RESS temperature plus the second calibrated value, then at step 330, the diagnosis sequence is completed and a diagnostic pass is recorded. In an embodiment, this pass suspends the diagnostic process until the vehicle is powered on again.

In FIG. 3, the determining actions of steps 326 and 328 are collectively identified by a dash-outlined box indicated as step 332. Step 332 can be considered to include the process of determining whether a relative coolant temperature ($\Delta T$) is less than a calibrated delta value. When the relative coolant temperature is less than a calibrated delta value, a diagnostic pass is recorded at step 330. The relative coolant temperature ($\Delta T$) may be calculated by comparing the coolant temperature with either the ambient temperature, the RESS temperature, or both the ambient and RESS temperatures. For example, step 332 may include calculating the relative coolant temperature by subtracting the ambient temperature plus a calibrated value from the coolant temperature ($\Delta T$)=($T_C-(T_A+V)$). On the other hand, step 332 may include calculating the relative coolant temperature by subtracting the RESS temperature plus a calibrated value from the coolant temperature ($\Delta T$)=($T_C-(T_R+V)$). Alternatively, the method may calculate two relative coolant temperatures by subtracting the ambient temperature plus a first calibrated value from the coolant temperature ($\Delta T_1$)=($T_C-(T_A+V_1)$) and by subtracting the RESS temperature plus a second calibrated value from the coolant temperature ($\Delta T_2$)=($T_C-(T_R+V_2)$).

If step 322 determines that an intrusive diagnostic was indicated, if step 324 determines that the active cooling system was not operating less than the calibrated time prior to powering off the vehicle, if step 326 determines that the coolant temperature is not less than (i.e., is equal to or greater than) the ambient temperature plus the first calibrated value, if step 328 determines that the coolant temperature is not less than (i.e., is equal to or greater than) the RESS temperature plus the second calibrated value, or if step 332 determines that the relative coolant temperature is not less than a calibrated delta value, then the controller 68 requires an intrusive diagnostic operation at step 334.

As described herein, a method and system for diagnosing performance of an active cooling system for a RESS in an electric vehicle, and particularly for liquid cooled batteries in an electric vehicle, has been provided. The method and system monitor performance of the active cooling system in a non-intrusive manner by comparing the coolant temperature with the ambient temperature and/or the RESS temperature. When the coolant temperature is elevated such that it is greater than either the ambient temperature (plus a calibrated value) or the RESS temperature (plus a calibrated value) then the method and system require use of a more intrusive diagnostic operation. Use of the non-intrusive method and system described herein reduces the amount of energy used in monitoring the active cooling system, as the intrusive diagnostic operation is only performed when called upon by the non-intrusive method or system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for diagnosing performance of an active cooling system for cooling a rechargeable energy storage system (RESS) with a coolant in an electric vehicle, the method comprising:
   determining, via a controller, whether a coolant temperature ($T_C$) is less than an ambient temperature plus a first calibrated value ($T_A+V_1$);
   determining, via the controller, whether the coolant temperature ($T_C$) is less than a RESS temperature plus a second calibrated value ($T_R+V_2$); and
   recording a diagnostic pass when the coolant temperature is less than the ambient temperature plus the first calibrated value, and less than the RESS temperature plus the second calibrated value.

2. The method of claim 1 further comprising:
   when the coolant temperature ($T_C$) is not less than the ambient temperature plus the first calibrated value ($T_A+V_1$), indicating that an intrusive diagnostic operation is necessary.

3. The method of claim 2 further comprising:
   when the coolant temperature ($T_C$) is not less than the RESS temperature plus the second calibrated value ($T_R+V_2$), indicating that an intrusive diagnostic operation is necessary.

4. The method of claim 1 further comprising:
   determining whether the vehicle is powered on; and
   when the vehicle is powered on, determining whether the active cooling system is operating, wherein it is determined whether the coolant temperature ($T_C$) is less than the ambient temperature plus the first calibrated value ($T_A+V_1$) when the vehicle is powered on and the active cooling system is operating.

5. The method of claim 1 further comprising:
   determining whether the vehicle is powered on;
   when the vehicle is not powered on, determining whether the active cooling system was operating;
   when the active cooling system was operating, determining whether an intrusive diagnostic operation was indicated, wherein it is determined whether the coolant temperature ($T_C$) is less than the ambient temperature plus the first calibrated value ($T_A+V_1$) when the vehicle is not powered on, the active cooling system was operating, and an intrusive diagnostic operation was not indicated.

6. The method of claim 1 further comprising:
   determining whether the vehicle is powered on;
   when the vehicle is not powered on, determining whether the active cooling system was operating;
   when the active cooling system was operating, determining whether an intrusive diagnostic operation was indicated;
   when an intrusive diagnostic operation was not indicated, determining if the active cooling system was operating less than a calibrated time prior to the vehicle being powered off, wherein it is determined whether the coolant temperature ($T_C$) is less than the ambient temperature plus the first calibrated value ($T_A+V_1$) when the vehicle is not powered on, the active cooling system was active, an intrusive diagnostic operation was not indicated, and the active cooling system was operating less than the calibrated time prior to the vehicle being powered off.

7. The method of claim 6 wherein determining whether the coolant temperature ($T_C$) is less than the ambient temperature plus a first calibrated value ($T_A+V_1$) comprises determining a duration of time passed since the active cooling system was operating and calculating the first calibrated value based on the duration.

8. The method of claim 7 wherein determining whether the coolant temperature ($T_C$) is less than the RESS temperature plus a second calibrated value ($T_R+V_2$) comprises determining the duration of time passed since the active cooling system was operating and calculating the second calibrated value based on the duration.

9. The method of claim 6 further comprising:
   when the coolant temperature ($T_C$) is not less than the ambient temperature plus the first calibrated value ($T_A+V_1$), indicating that an intrusive diagnostic operation is necessary.

10. The method of claim 9 further comprising:
    when the coolant temperature ($T_C$) is not less than the RESS temperature plus the second calibrated value ($T_R+V_2$), indicating that an intrusive diagnostic operation is necessary.

11. A method for performing a diagnostic operation on an active cooling system for cooling a rechargeable energy storage system (RESS) in an electric vehicle with a coolant, the method comprising:
    determining via a processor whether a first relative temperature ($\Delta T$) of the coolant is less than a first calibrated delta value;
    when the first relative temperature of the coolant is less than the first calibrated delta value, determining whether a second relative temperature of the coolant is less than a second calibrated delta value, and when the second relative temperature of the coolant is less than the second calibrated delta value, recording a diagnostic pass; and
    when the second relative temperature of the coolant is not less than the second calibrated delta value, indicating that a more intrusive diagnostic is required.

12. The method of claim 11 wherein determining whether a first relative temperature of the coolant is less than a first calibrated delta value comprises calculating the first relative temperature of the coolant by subtracting a RESS temperature plus a calibrated value from the coolant temperature ($T_C-(T_R+V)$).

13. The method of claim 11 wherein determining whether the first relative temperature of the coolant is less than a first calibrated delta value comprises calculating the first relative temperature of the coolant by subtracting an ambient temperature plus a first calibrated value from the coolant temperature ($T_C-(T_A+V_1)$)).

14. The method of claim 13 wherein determining whether the second relative temperature of the coolant is less than a second calibrated delta value comprises calculating the second relative temperature of the coolant by subtracting an RESS temperature plus a second calibrated value from the coolant temperature ($T_C-(T_R+V_2)$)).

15. The method of claim 11 further comprising:
    determining whether the vehicle is powered on;
    when the vehicle is not powered on, determining whether the active cooling system was operating during a period before the vehicle was powered off; and
    when the active cooling system was operating during the period before the vehicle was powered off, determining a duration of time passed since the active cooling system was operating and calculating a calibrated value based on the duration;
    wherein determining whether the first relative temperature of the coolant is less than a first calibrated delta value comprises calculating the relative temperature of the coolant by subtracting from a coolant temperature the sum of the calibrated value and either an ambient temperature or a RESS temperature.

16. A method for performing a diagnostic operation on an active cooling system for cooling a rechargeable energy storage system (RESS) in an electric vehicle with a coolant, the method comprising:
    calculating a relative coolant temperature ($\Delta T$) by subtracting an ambient temperature plus a first calibrated value from a coolant temperature ($T_C-(T_A+V_1)$) or by subtracting a RESS temperature plus a second calibrated value from the coolant temperature ($T_C-(T_R+V_2)$);
    determining via a processor whether the relative coolant temperature is less than a calibrated delta value; and
    recording a diagnostic pass when the relative coolant temperature is less than the calibrated delta value.

17. The method of claim 16 further comprising indicating that a more intrusive diagnostic is required when the relative coolant temperature is not less than the calibrated delta value.

18. The method of claim 16 wherein the relative coolant temperature is a first relative coolant temperature, the method further comprising:
    when the first relative coolant temperature is less than the calibrated delta value, determining whether a second relative coolant temperature is less than a second calibrated delta value;
    when the second relative coolant temperature is less than the second calibrated delta value, recording a diagnostic pass; and
    when the second relative coolant temperature is not less than the second calibrated delta value, indicating that a more intrusive diagnostic is required.

* * * * *